United States Patent
Watanabe et al.

(10) Patent No.: US 6,490,257 B1
(45) Date of Patent: Dec. 3, 2002

(54) MOBILE STATION APPARATUS AND ITS TRANSMISSION POWER METHOD IN WIRELESS COMMUNICATION SYSTEM

(75) Inventors: Masatoshi Watanabe, Yokohama (JP); Osamu Kato, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/297,091

(22) Filed: May 17, 1999

(51) Int. Cl.[7] .................................. H04J 13/02
(52) U.S. Cl. .................... 370/318; 370/320; 455/69
(58) Field of Search ................. 375/259, 295, 375/364, 363, 362, 345, 297, 316; 370/522, 525, 526, 342, 318, 320; 455/69

(56) References Cited

U.S. PATENT DOCUMENTS

| | | | | |
|---|---|---|---|---|
| 5,485,486 A | * | 1/1996 | Gilhousen et al. | 370/335 |
| 5,539,728 A | * | 7/1996 | Gaiani et al. | 370/342 |
| 5,621,723 A | * | 4/1997 | Walton et al. | 370/335 |
| 5,673,260 A | * | 9/1997 | Umeda et al. | 370/342 |
| 5,815,798 A | * | 9/1998 | Bhagalia et al. | 455/13.4 |
| 5,915,216 A | * | 6/1999 | Lysejko | 455/422 |
| 6,229,792 B1 | * | 5/2001 | Anderson et al. | 370/280 |

FOREIGN PATENT DOCUMENTS

| | | |
|---|---|---|
| EP | 0668664 | 8/1995 |
| EP | 0668665 | 8/1995 |
| JP | 2117227 | 5/1990 |
| JP | 7-74727 | 3/1995 |
| JP | 7221700 | 8/1995 |
| JP | 7226710 | 8/1995 |
| JP | 7297753 | 11/1995 |
| JP | 8-70274 | 3/1996 |
| JP | 8163086 | 6/1996 |
| JP | 8168075 | 6/1996 |
| JP | 9102768 | 4/1997 |
| JP | 9107579 | 4/1997 |
| JP | 9261172 | 10/1997 |

OTHER PUBLICATIONS

An English Language abstract of JP 7–74727.
An English Language abstract of JP 9–261172.
An English Language abstract of JP 9–107579.
An English Language abstract of JP 9–102768.
An English Language abstract of JP 8–168075.
An English Language abstract of JP 8–163086.
An English Language abstract of JP 8–70274.
An English Language abstract of JP 7–297753.
An English Language abstract of JP 7–226710.
An English Language abstract of JP7–221700.
An English Language abstract of JP 2–117227.

(List continued on next page.)

Primary Examiner—Daniel Hunter
Assistant Examiner—Andrew Harry
(74) Attorney, Agent, or Firm—Greenblum & Bernstein, P.L.C.

(57) ABSTRACT

When carrying out CDMA/TDD-based data communications between a base station apparatus and mobile station apparatus, the base station apparatus and mobile station apparatus carry out VOX control turning ON/OFF transmission operation according to the presence/absence of transmission data and if transmission on the base station transmitting side is OFF the mobile station receiving side receives channels being sent all the time from the base station apparatus, performing open-loop transmission power control, and if transmission on the mobile station transmitting side is OFF the mobile station apparatus transmits dummy slots with small transmission power while the base station receiving side receives the dummy slots, performing transmission space diversity.

6 Claims, 5 Drawing Sheets

OTHER PUBLICATIONS

"Evaluation of Transmitting Power Control for CDMA/ TDD Systems", K. Miya et al., 1994, IEEE Spring B–418.

"Power Control in Packet Switched Time Division Duplex Direct Sequence Spread Spectrum Communications", R. Esmailzadeh et al., proc. ofVTC 1992, IEEE pub. No. 0–7803–0673–2/92, pp. 989–992, 1992.

"A Base–Station–Based Diversity Scheme for CDMA/TDD Systems", k. Miya et al., IEEE "Technical Report of IEICE" RCS 94–73, pp. 25–30, (Sep. 1994).

Syudy of A High Efficient Battery Saving Control, Y. Arikawa et al., 1995 IEEE Society B–243.

* cited by examiner

MOBILE STATION APPARATUS AND ITS TRANSMISSION POWER METHOD IN WIRELESS COMMUNICATION SYSTEM

Technical Field

The present invention relates to mobile communication apparatuses used for cellular radio communication systems such as digital car telephones and portable telephones, especially mobile communication apparatuses which perform open-loop transmission power control and prevent deterioration of transmission diversity performance when performing VOX (Voice Operated Transmission) control.

BACKGROUND ART

In cellular radio communication systems such as car telephones and portable telephones, a CDMA (Code Division Multiple Access) system is known as one of the multiple access technologies which allow a plurality of mobile stations to carry out communications on a same frequency band simultaneously. There are also other systems known as the multiple access technologies such as FDMA (Frequency Division Multiple Access), TDMA (Time Division Multiple Access). The CDMA system has advantages over other technologies such as the ability to achieve high frequency utilization efficiency and accommodate more users.

The CDMA system uses user-specific spreading codes to distinguish a plurality of users who share the same frequency band and achieves multiple accesses through spread spectrum communications in which spreading codes are carried on an information signal which is transmitted with its spectrum spread over a sufficiently wide band relative to the original information bandwidth. The method of directly carrying spreading codes on the information signal is called "direct sequence." In the direct sequence CDMA system, signals from a plurality of mobile stations are multiplexed on a same frequency area and same time zone.

On the other hand, one of the radio communication systems using a same band on both transmitting and receiving sides is a TDD (Time Division Duplex) system. The TDD system is also called "ping-pong system" and is a system in which communications are carried out with a same radio frequency time-divided between transmission and reception. In contrast to the TDD system, there is an FDD (Frequency Division Duplex) system. The FDD system is a system in which communications are carried out using different frequencies between transmission and reception.

Figure 5A:
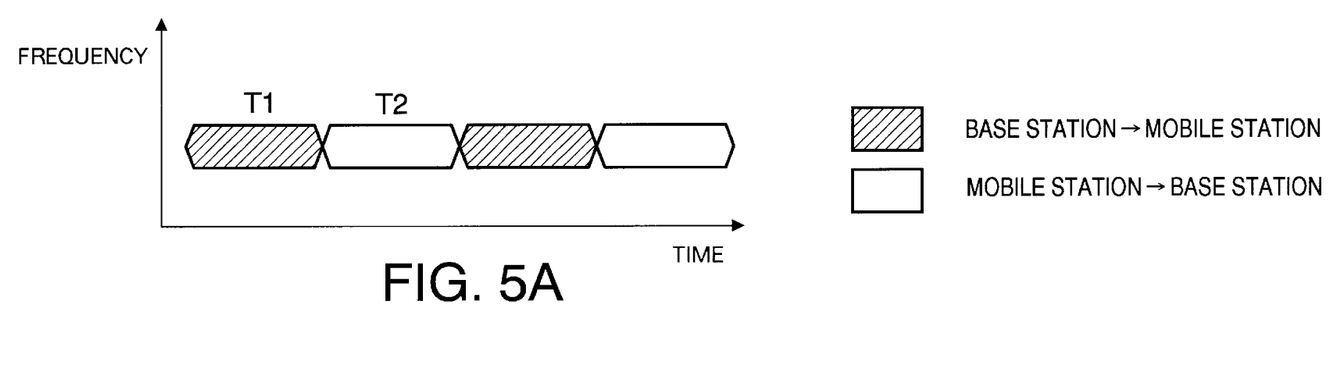
FIG. 5A is a conceptual drawing showing the concept of a TDD system.
Figure 5B:
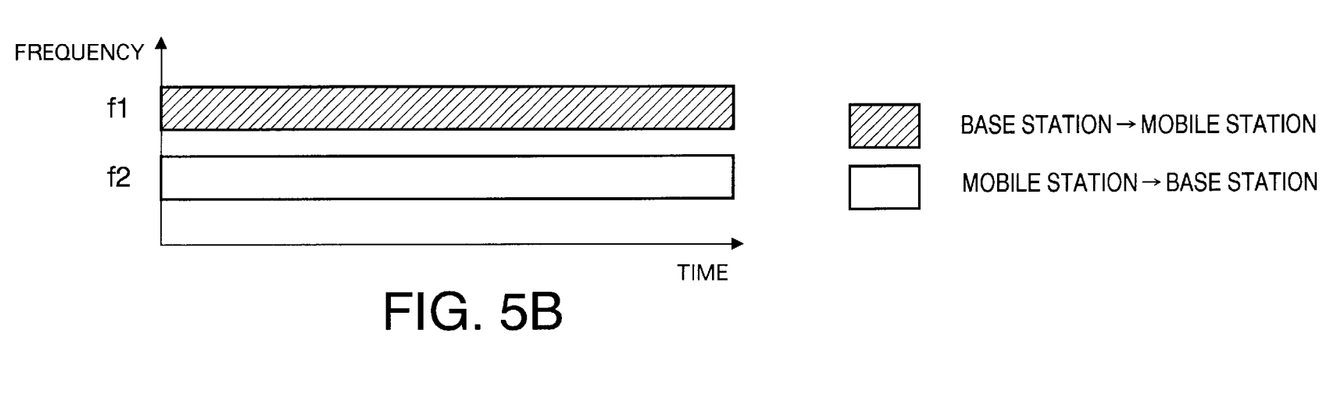
FIG. 5B is a conceptual drawing showing the concept of an FDD system.

FIG. 5A shows a conceptual drawing of the TDD system and FIG. 5B shows a conceptual drawing of the FDD system. In FIG. 5A, at time T1, the base station transmits and the mobile station receives. At next time T2, the mobile station transmits and the base station receives. Communications using a single frequency band are achieved by repeating this.

In FIG. 5B, at frequency f1, the base station transmits and the mobile station receives, and at frequency f2, the mobile station transmits and the base station receives. The time unit for this transmission or reception is called a "slot."

The direct sequence CDMA system has a so-called "near-far problem" when a desired transmission station is far and a non-desired transmission station (interference station) is near. This problem is that the reception power of the signal from the interference station becomes greater than that from the desired transmission station which prevents the processing gain (spreading gain) alone from suppressing mutual correlation between spreading codes, which disables communication.

In a cellular radio communication system using the direct sequence CDMA system, it is therefore indispensable to perform transmission power control according to the state of each transmission path.

Another factor for deteriorating the line quality in terrestrial mobile communications is fading. As one of the fading countermeasures, a method of compensating variations of instantaneous values of the reception power by controlling the transmission power is proposed.

Theses "Study on Transmission Power Control in CDMA/TDD Transmissions" (Miya, Hayashi, Kato, 1994, IEICE spring B-418) and "POWER CONTROL IN PACKETS SWITCHED TIME DIVISION DUPLEX SEQUENCE SPREAD SPECTRUM COMMUNICATIONS" (R. ESMAILZADEH, M.NAKAGAWA, A.KAJIWARA, proc. of VTC'92. pp.989–992, 1992) present transmission power control methods according to the CDMA/TDD system.

Fading has symmetry that variations are identical between transmission and reception if a same frequency band is used. Therefore, the CDMA/TDD system uses open-loop transmission power control which consists of detecting power of the reception signal, controlling the transmission situation by this and transmitting signals by determining the transmission power level according to the transmission situation. This allows the CDMA/TDD system to carry out more simple and high-speed and high-precision transmission power control than the FDD system.

Another effective fading countermeasure is space diversity technology. The space diversity technology receives radio signal using a plurality of antennas placed in different locations and combining and demodulating the received signals. Since fading variations of a received signal is non-correlative with each transmission path, the space diversity technology can reduce the probability of the reception power level of dropping due to fading, suppressing deterioration of the reception quality.

The TDD system also takes advantage of the transmission-reception symmetry in fading variations in the radio transmission path, places a plurality of antennas in the base station, allows the base station to carry out diversity reception, detect a transmission environment for each antenna and use the optimum antenna for transmission from the base station.

This allows space diversity to be performed even with a single antenna of the mobile station on the downlink, improving the line quality without expanding the hardware scale of the mobile station.

Thesis "Proposal for Base Station Transmission/Reception Diversity System in CDMA/TDD Transmission" (Miyaji, RCS 94–73, p.25–30, 1994-09) presents a transmission space diversity method according to the CDMA/TDD system.

VOX control in portable telephones, etc. is a technology that carries out transmissions only when there is voice to be transmitted and turns off transmission when there is no voice to be transmitted, contributing to power saving. In the CDMA system, the VOX control technology is an important technology in increasing the system capacity.

While the system capacity is fixed in the TDMA and FDMA, the system capacity for the CDMA is determined by the amount of interference from users who carry out communications simultaneously. This is called "soft capacity."

The system capacity in the CDMA system can be increased by reducing interference.

Stopping transmission by VOX reducing interference with other users, leading to an increase of the system capacity. For example, when the tone to silence ratio of all users is 50 percent, the number of users who are transmitting simultaneously is statistically a half, doubling the capacity in consequence.

However, if VOX control is performed in the CDMA/TDD system, there are slots which are not transmitted when there is no voice. When this happens, the receiving side cannot estimate the state of the transmission path from the received signal for the slots which are not transmitted. As a result, it is impossible to perform open-loop transmission power control and transmission space diversity, causing a problem of slowing down the fading variation speed that can be followed by control, deteriorating the speed performance.

DISCLOSURE OF INVENTION

The present invention has been implemented taking into account the actual situations described above and it is an objective of the present invention to provide a mobile communication apparatus that will not deteriorate the performance of open-loop transmission power control and transmission diversity even when VOX control is performed.

In order to achieve the aforementioned objective, the present invention performs VOX control such that when transmission on the base station transmitting side is OFF, the mobile station receives channels being always transmitted from the base station and performs open-loop transmission power control, and when transmission from the mobile station is OFF, it transmits dummy slots with small transmission power and the base station receives the dummy slots to carry out transmission space diversity.

The communication system of the present invention comprises a plurality of base stations and a plurality of mobile stations provided with communication means according to direct sequence CDMA/TDD (code division multiple access/time division duplex) systems as multiple access systems, with both the base stations and mobile stations equipped with a VOX function by which transmission is turned ON/OFF according to the presence/absence of transmission data during a communication. The base stations comprise a plurality of antennas, a reception diversity function to combine the signals received from a plurality of antennas above at a TDD reception time and a transmission diversity function that transmits at a TDD transmission time using the antenna which had the maximum reception power at the TDD reception time. The mobile stations comprise a function of transmitting dummy signals with smaller transmission power than normal transmission power when transmission is OFF.

Such a communication system performs VOX control that makes it possible to suppress deterioration of the performance of transmission space diversity at the base stations by using dummy signals even if transmission from the mobile stations is OFF.

Another communication system of the present invention has base stations comprising a common control channel transmission function for transmission/reception of control information to which a plurality of mobile stations are connected, and mobile stations comprising a function for detecting the power level of a received signal at a TDD reception time, a transmission power control function for controlling transmission power at a TDD transmission time using the received signal level above and a function for controlling transmission power by receiving the control channels above when transmission from the base stations is OFF.

This communication system performs VOX control that allows the mobile stations to receive control channels and use them to control transmission power even if transmission from the base stations is OFF, making it possible to reduce deterioration of the performance of open-loop transmission power control.

BEST MODE FOR CARRYING OUT THE INVENTION

With reference now to the attached drawings, the embodiment of the present invention applied to a cellular radio communication system comprising a base station apparatus and a plurality of mobile station apparatuses is explained in detail below.

Figure 1:
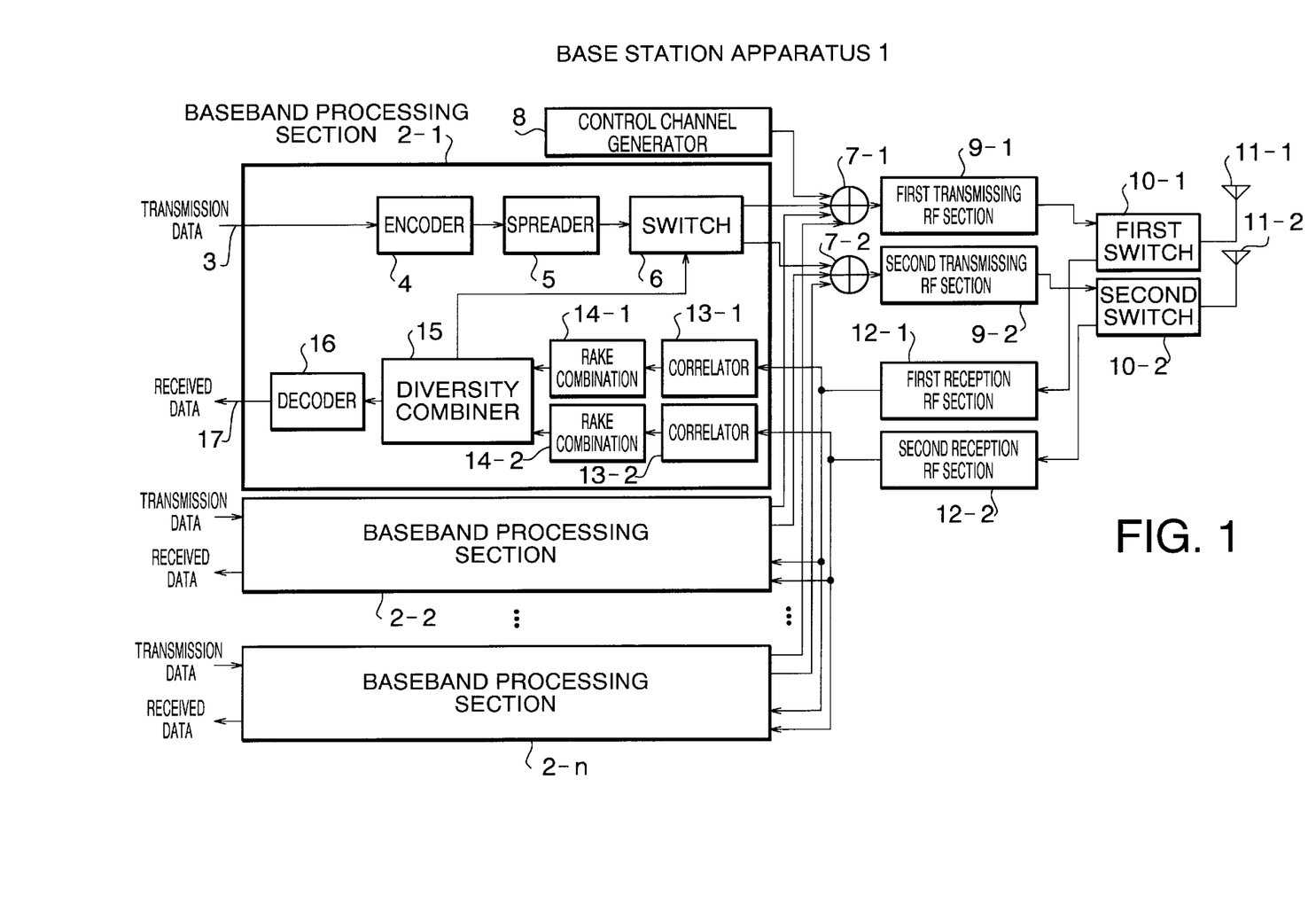
FIG. 1 is a functional block diagram of a base station apparatus of a cellular radio communication system according to an embodiment of the present invention.
Figure 2:
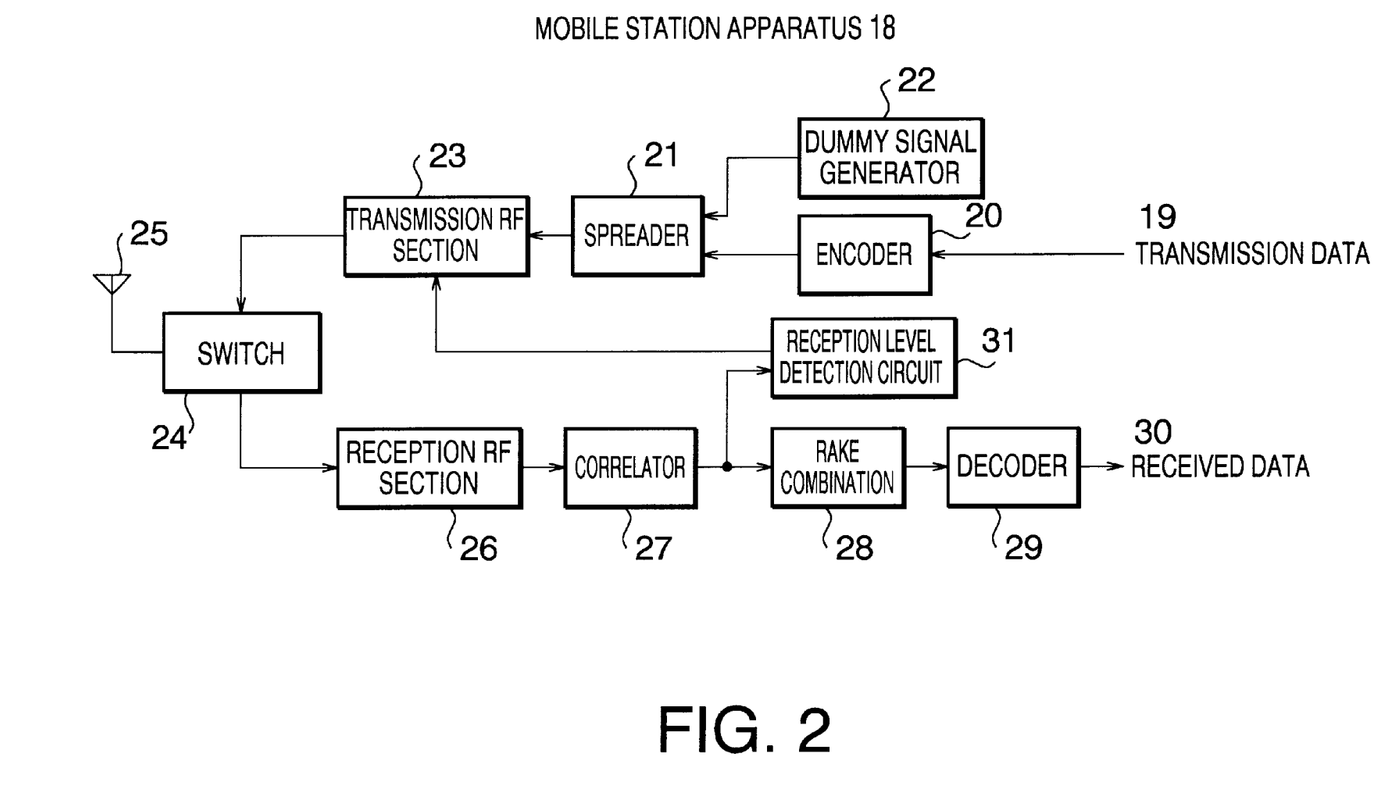
FIG. 2 is a functional block diagram of a mobile station apparatus of a cellular radio communication system of the embodiment of the present invention.

FIG. 1 illustrates the base station apparatus in the cellular radio communication system according to the present embodiment and FIG. 2 illustrates the mobile station apparatus in the cellular radio communication system. In the cellular radio communication system according to the present embodiment, suppose that CDMA/TDD communications are carried out between the base station and mobile stations.

Base station apparatus 1 comprises a plurality of baseband processing sections 2-1 to 2-n placed in parallel. The base station in the cellular radio communication system carries out communications with a plurality of mobile stations simultaneously and the number of baseband processing sections 2-1 to 2-n provided corresponds to a maximum number of mobile stations capable of communicating simultaneously. Baseband processing sections 2-1 to 2-n are hereafter simply referred to as baseband processing section 2 if no distinctions are made between them.

Base station apparatus 1 transmits transmission data 3 to a mobile station using a TDD base station transmission slot. In the TDD system, each of slots composing a frame is time-divided between a base station transmission slot and mobile station transmission slot. When the base station is a transmission slot, then the mobile station becomes a reception slot. On the other hand, when a mobile station is a transmission slot, then the base station becomes a reception slot.

Transmission data 3 is input to baseband processing section 2. Transmission data 3 is supplied to encoder 4 in baseband processing section 2. Encoder 4 encodes transmission data 3, assembles it into a frame and sends it to spreader 5. Spreader 5 in baseband processing section 2 is assigned spreading codes which are different from a mobile station to another. Spreader 5 performs spreading processing on the frame-assembled transmission data using a spreading code assign to the mobile station to which the transmission data are directed. The spectrum spread transmission data are given to switch 6. Switch 6 outputs the transmission data to either first adder 7-1 or second adder 7-2 according to a signal given from the diversity combiner which will be described later. On the other hand, control channel generator 8 outputs the control channel signal which has been spread with a dedicated spreading code to first adder 7-1. First adder 7-1 and second adder 7-2 add up the outputs of a plurality of baseband processing sections 2-1 to 2-n and control channel generator 8. Each of the outputs of first adder 7-1 and second adder 7-2 is output to corresponding first transmission RF section 9-1 and second transmission RF section 9-2. First transmission RF section 9-1 and second transmission RF section 9-2 perform processing such as modulation, frequency conversion and amplification on the incoming transmission data and transmit them from first antenna 11-1 and second antenna 11-2 to a radio transmission path via first switch 10-1 and second switch 10-2, respectively.

On the other hand, base station apparatus receives a multiplexed signal from a plurality of mobile stations through TDD base station reception slots. First antenna 11-1 and second antenna 11-2 receive multiplexed signals from a plurality of mobile stations through different radio transmission paths and output them to first reception RF section 12-1 and second reception RF section 12-2.

First reception RF section 12-1 and second reception RF section 12-2 perform frequency conversion, automatic gain control processing and demodulation processing on the multiplexed received signals and output them to a plurality of baseband processing sections 2-1 to 2-n. The outputs of first reception RF section 12-1 and second reception RF section 12-2 are input in parallel to correlators 13-1 and 13-2 provided in baseband processing section 2. Correlators 13-1 and 13-2 separate signals directed to themselves from the outputs of first reception RF section 12-1 and second reception RF section 12-2 through correlation processing using spreading codes assign to the mobile stations which sent the signals. The separated signals are RAKE-combined by RAKE combiners 14-1 and 14-2 and output to diversity combiner 15.

Diversity combiner 15 combines the output of first RAKE combiner 14-1 and the output of second RAKE combiner 14-2 and outputs the combination result to decoder 16. Diversity combiner 15 compares the output of first RAKE combiner 14-1 and the output of second RAKE combiner 14-2 and determines the antenna to be used for transmission in the next TDD transmission slot. It determines which antenna is used for transmission, first antenna 11-1 or second antenna 11-2. The selection signal indicating the antenna to be used for transmission is output from diversity combiner 15 to switch 6. Decoder 16 decodes the input and obtains reception data 17.

On the other hand, mobile station apparatus 18, through the TDD mobile station transmission slot, transmits transmission data 19 to the base station. Transmission data 19 is input to encoder 20. Encoder 20 encodes transmission data 19 and assembles it into frames. The frame-assembled transmission data is input to spreader 21. At this time, dummy signal generator 22 outputs a dummy signal to spreader 21 at a prescribed timing which will be described later. Spreader 21 carries out spreading processing on the input signal using spreading codes which vary from one mobile station to another and outputs the spread signal to transmission RF section 23. Transmission RF section 23 carries out modulation, frequency conversion and amplification processing on the input signal. The output of transmission RF section 23 is transmitted to a radio transmission path from antenna 25 after passing through switch 24.

On the other hand, mobile station apparatus 18, through the TDD mobile station reception slot, receives a signal transmitted from the base station. The signal received from the base station through antenna 25 is output to reception RF section 26. Reception RF section 26 carries out frequency conversion, automatic gain control processing and demodulation processing on the multiplexed received signal and outputs it to correlator 27. Correlator 27 carries out correlation processing on the output of reception RF section 26 using spreading codes which vary from one mobile station to another and separates a signal directed to itself. The separated signal is RAKE-combined by RAKE combiner 28, decoded by decoder 29 and output as reception data 30.

On the other hand, the output of correlator 27 is input to reception level detection circuit 31. Reception level detection circuit 31 detects the average power of the correlation output of a mobile station transmission slot and uses it to determine the transmission power of the next time-division multiplexed transmission slot and outputs the control signal to transmission RF section 23.

Figure 3:
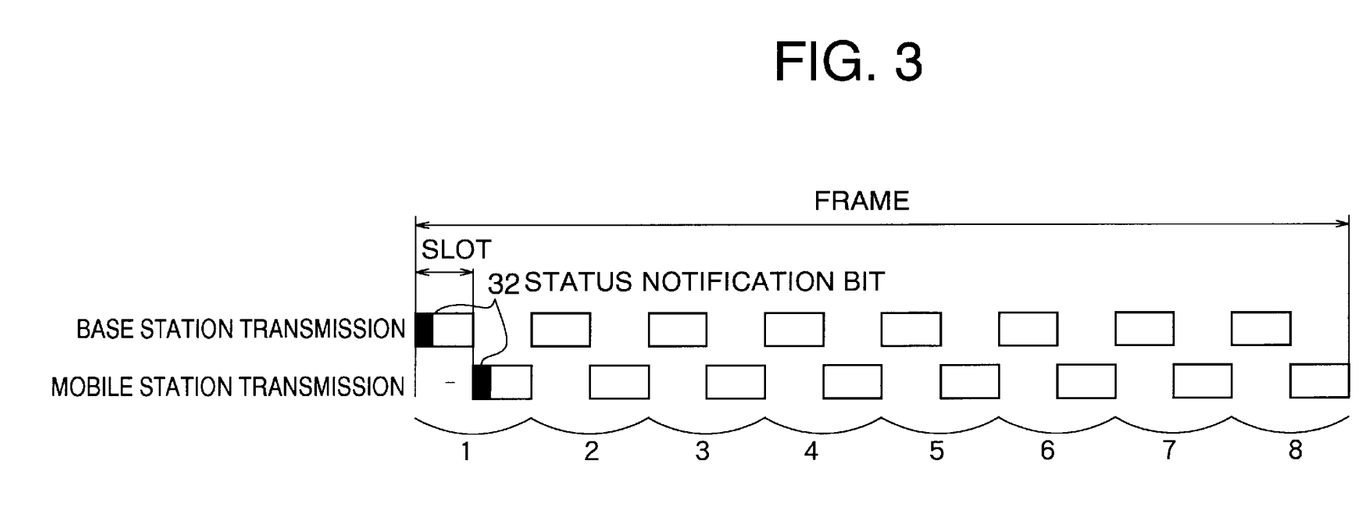
FIG. 3 is a drawing showing the frame configuration of the embodiment of the present invention.

FIG. 3 shows the frame configuration of transmission data. As shown in FIG. 3, a frame have a plurality of slots and the start position of a frame is designed to be occupied by a transmission slot of the base station. In the example shown in the figure above, one frame have 8 slots. Each frame, through its start slot, transmits status notification bit 32 indicating the presence/absence of data in the frame. Therefore, the start slot of a frame needs to be transmitted even if there are no transmission data and the presence/absence of transmission data is switched in frame units.

The operation of the cellular radio communication system configured as shown above under VOX control is explained. It is explained in three different situations; when only transmission from the base station is OFF, when only transmission from the mobile station is OFF, and when transmissions from both the base station and mobile station are OFF.

When transmission operation is OFF for only the base station apparatus:

Base station apparatus 1 transmits, through the start slot of a frame, status notification bit 32 indicating that transmission operation will be turned off and the remaining 7 slots stop transmission.

Mobile station apparatus 18 receives the start slot which sent status notification bit 32 indicating that transmission operation would be turned off. Mobile station apparatus 18 checks the content of status notification bit 32 received by the start slot of the reception frame and recognizes that the received frame actually contains no data.

When the start slot of the reception frame receives status notification bit 32, correlator 27 separates a signal directed to itself using spreading codes assigned for each mobile station for only status notification bit 32 of the start slot. Reception level detection circuit 31 detects the power of the signal directed to itself from the received signal of the start slot in order to carry out transmission power control. Correlator 27 carries out correlation processing using spreading codes of control channels transmitted all the time through the reception slot on the remaining 7 slots of the reception frame into which status notification bit 32 was sent with the start slot. Reception level detection circuit 31 detects the power of correlation values concerning the control channels for the remaining 7 slots and carries out transmission power control based on this detection result.

Therefore, even if there is no transmission signal from base station apparatus 1, there is no variation in the control interval of transmission power control in mobile station apparatus 18 making it possible to suppress performance deterioration.

Figure 4A:
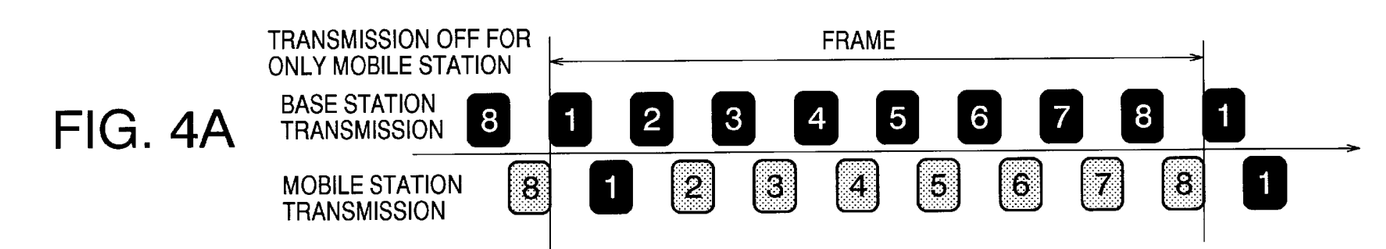
FIG. 4A is a drawing showing the frame configuration of the embodiment of the present invention when transmission from only the mobile station is OFF.

When transmission operation is turned off for only mobile station apparatus:

Mobile station apparatus 18 transmits, through the start slot of the transmission frame, status notification bit 32 indicating that transmission operation will be turned off and the remaining 7 slots within the transmission frame transmit dummy signals. FIG. 4A illustrates the transmission status of each slot when only the mobile station apparatus turns off transmission operation. These dummy signals are generated by dummy signal generator 22 and spread by spreader 21.

Base station apparatus 1, through the. frame start slot as a normal case, selects the transmission antenna for the next transmission based on the power of a desired signal separated from the signal received by first antenna 11-1 and second antenna 11-2 by correlators 13-1 and 13-2 and RAKE combiners 14-1 and 14-2, and through the remaining 7 slots of the same frame, selects the transmission antenna for the next transmission based on the power of dummy signals separated from the signal received by first antenna 14-1 and second antenna 14-2 by correlators 13-1 and 13-2 and RAKE combiners 14-1 and 14-2.

This allows transmission space diversity to be carried out as in the case where there are transmission data of mobile station apparatus 18.

Dummy signals are transmitted from the mobile station in order for the base station to select the antenna. When dummy signals-are only used in order for the base station to select the antenna, such dummy signals require smaller transmission power than normal slots. Mobile station apparatus 18 thus controls the dummy signals so that they use smaller transmission power than that for normal slots. This reduces interference with other users.

Figure 4B:
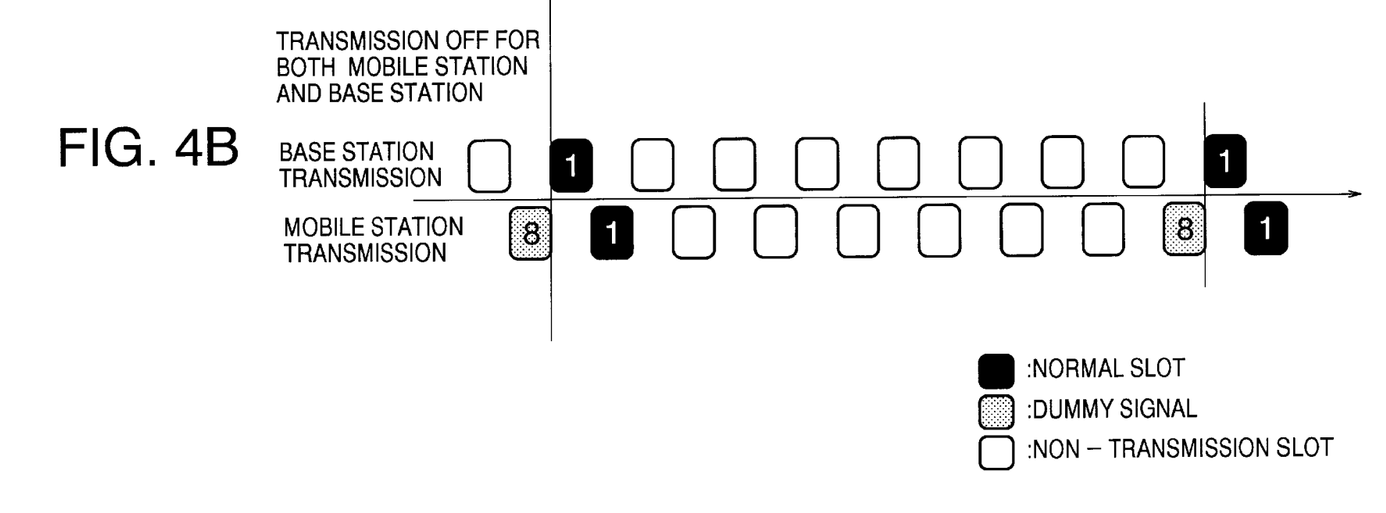
FIG. 4B is a drawing showing the frame configuration of the embodiment of the present invention when transmissions from both the base station and mobile station are OFF.

When both base station apparatus and mobile station apparatus turn OFF their transmission operation: The open-loop transmission power control of mobile station apparatus 18 carries out control similar to that when transmission is OFF for only base station apparatus 1.

Base station apparatus 1 only transmits the start slot within the frame.

In order for base station apparatus 1 to select the transmission antenna to transmit the transmission data of the start slot, there should only be a received signal in the reception slot just before, that is the last slot of the preceding frame. Therefore, mobile station apparatus 18 sends a dummy signal only to the last slot of one frame. Therefore, there exists a slot where mobile station apparatus 18 completely stops transmission, enhancing thus the effect of reducing interference with other users.

INDUSTRIAL APPLICABILITY

As shown above, the mobile communication apparatus according to the present invention is useful for VOX control in a cellular radio communication system using the CDMA/TDD systems and is suitable for open-loop transmission power control under VOX control and suppressing deterioration of the performance of transmission diversity.

What is claimed is:

1. A mobile station apparatus comprising:
   a check section that checks whether data is transmitted from a base station apparatus; and
   a control section that,
      if the data is transmitted from the base station apparatus, controls transmission power of a slot to be transmitted to the base station apparatus based on reception power of the data, while
      if no data is transmitted from the base station, controls transmission power of a slot to be transmitted to the base station apparatus based on reception power of a control channel signal that is always transmitted from the base station apparatus.

2. A mobile station apparatus according to claim 1, wherein said check section checks if the data is transmitted from the base station apparatus by referring to a status notification bit, the status notification bit being contained in a first slot of a reception frame.

3. A mobile station apparatus according to claim 1, further comprising:
   a transmission section that, if there is no data to be transmitted to the base station apparatus,
   transmits a second status notification bit in a first slot of a transmission frame, the second status notification bit indicating that there is no data to be transmitted to the base station apparatus, and
   transmits a dummy signal in at least one slot other than the first slot of the transmission frame, the dummy signal being used for selection of a transmission antenna at the base station apparatus.

4. A mobile station apparatus according to claim 3, wherein said transmission section transmits the dummy signal in a last slot of the transmission frame.

5. A mobile station apparatus according to claim 3, where said transmission section consumes less transmission power in transmitting the slot containing the dummy signal than in transmitting a slot containing a signal other than the dummy signal.

6. A transmission power control method for a mobile station apparatus, the transmission power control method comprising:
   checking whether data is transmitted from a base station apparatus,
   if the data is transmitted from the base station, controlling transmission power of a slot to be transmitted to the base station apparatus based on reception power of the data, while
   if no data is transmitted from the base station, controlling transmission power of a slot to be transmitted to be base station apparatus based on reception power of a control channel signal that is always transmitted from the base station apparatus.

* * * * *

UNITED STATES PATENT AND TRADEMARK OFFICE
CERTIFICATE OF CORRECTION

PATENT NO.     : 6,490,257 B1
DATED          : December 3, 2002
INVENTOR(S)    : M. Watanabe et al.

It is certified that error appears in the above-identified patent and that said Letters Patent is hereby corrected as shown below:

<u>Title page,</u>
Item [63], the following Related U.S. Application Data was omitted and should be included:
-- This application is a §371 of PCT/JP97/03319, filed September 19, 1997 --.
Item [56], References Cited, the following U.S. Patent Document was omitted and should be included:
-- 5,559,789        9/1996        Nakano et al. --.

Signed and Sealed this

Tenth Day of June, 2003

JAMES E. ROGAN
*Director of the United States Patent and Trademark Office*